(12) United States Patent
Nixon

(10) Patent No.: US 11,040,587 B2
(45) Date of Patent: Jun. 22, 2021

(54) HITCH AND BALL ALIGNMENT DEVICE

(71) Applicant: George Nixon, Fairfield, CA (US)

(72) Inventor: George Nixon, Fairfield, CA (US)

( * ) Notice: Subject to any disclaimer, the term of this patent is extended or adjusted under 35 U.S.C. 154(b) by 345 days.

(21) Appl. No.: 16/156,741

(22) Filed: Oct. 10, 2018

(65) Prior Publication Data

US 2020/0114711 A1 Apr. 16, 2020

(51) Int. Cl.
- *B60D 1/62* (2006.01)
- *B60D 1/36* (2006.01)
- *B60K 35/00* (2006.01)
- *B60D 1/06* (2006.01)

(52) U.S. Cl.
CPC ............... *B60D 1/36* (2013.01); *B60D 1/06* (2013.01); *B60D 1/62* (2013.01); *B60K 35/00* (2013.01)

(58) Field of Classification Search
CPC ... B60D 1/62; B60D 1/06; B60D 1/36; B60K 35/00; B60K 2370/193; B60K 2370/152; B60W 2300/14
See application file for complete search history.

(56) References Cited

U.S. PATENT DOCUMENTS

| | | |
|---|---|---|
| 4,852,901 A | 8/1989 | Beasley |
| 5,191,328 A | 3/1993 | Nelson |
| 5,650,764 A | 7/1997 | McCullough |
| 5,861,814 A | 1/1999 | Clayton |
| D419,092 S | 1/2000 | Gildersleeve |
| 7,151,443 B2 | 12/2006 | Dialinakis |
| 7,309,075 B2 | 12/2007 | Ramsey |
| 8,038,166 B1 | 10/2011 | Piesinger |
| 8,262,120 B1 | 9/2012 | Pitts |
| 9,566,911 B2 * | 2/2017 | Greenwood ............... G06T 7/20 |
| 10,112,537 B2 * | 10/2018 | Lavoie ...................... B60R 1/00 |
| 2005/0285371 A1 * | 12/2005 | Ramsey ................... B60D 1/06 280/477 |
| 2010/0013188 A1 * | 1/2010 | Ortmann .................. B60D 1/62 280/477 |
| 2015/0353051 A1 * | 12/2015 | Muller ................. H04B 1/3822 701/2 |
| 2017/0008559 A1 * | 1/2017 | Shepard ................. B62D 13/06 |
| 2017/0217372 A1 * | 8/2017 | Lu ...................... H04N 5/23293 |

* cited by examiner

*Primary Examiner* — Kevin Hurley
*Assistant Examiner* — Marlon A Arce

(57) ABSTRACT

A hitch and ball alignment device for aligning a tow ball with a trailer tongue includes a first sensing unit and a controller. The first sensing unit comprises a first sensor, which is position type, and a first transmitter. A first coupler is coupled to the first sensing unit and is configured to removably couple the first sensing unit to one of a tow ball, which is coupled to a vehicle, and a trailer tongue. The controller comprises a screen and a receiver. The first sensor is configured to determine a distance between the first sensing unit and the other of the tow ball and the trailer tongue and to signal the controller via the first transmitter. The controller is positioned display the positions of the tow ball and the trailer tongue on the screen to guide a user to align the tow ball with the trailer tongue.

18 Claims, 4 Drawing Sheets

US 11,040,587 B2

HITCH AND BALL ALIGNMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to alignment devices and more particularly pertains to a new alignment device for aligning a tow ball with a trailer tongue.

BRIEF SUMMARY OF THE INVENTION

An embodiment of the disclosure meets the needs presented above by generally comprising a tow ball with a trailer tongue includes a first sensing unit and a controller. The first sensing unit comprises a first sensor, which is position type, and a first transmitter. A first coupler is coupled to the first sensing unit and is configured to removably couple the first sensing unit to one of a tow ball, which is coupled to a vehicle, and a trailer tongue. The controller comprises a screen and a receiver. The first sensor is configured to determine a distance between the first sensing unit and the other of the tow ball and the trailer tongue and to signal the controller via the first transmitter. The controller is positioned display the positions of the tow ball and the trailer tongue on the screen to guide a user to align the tow ball with the trailer tongue.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
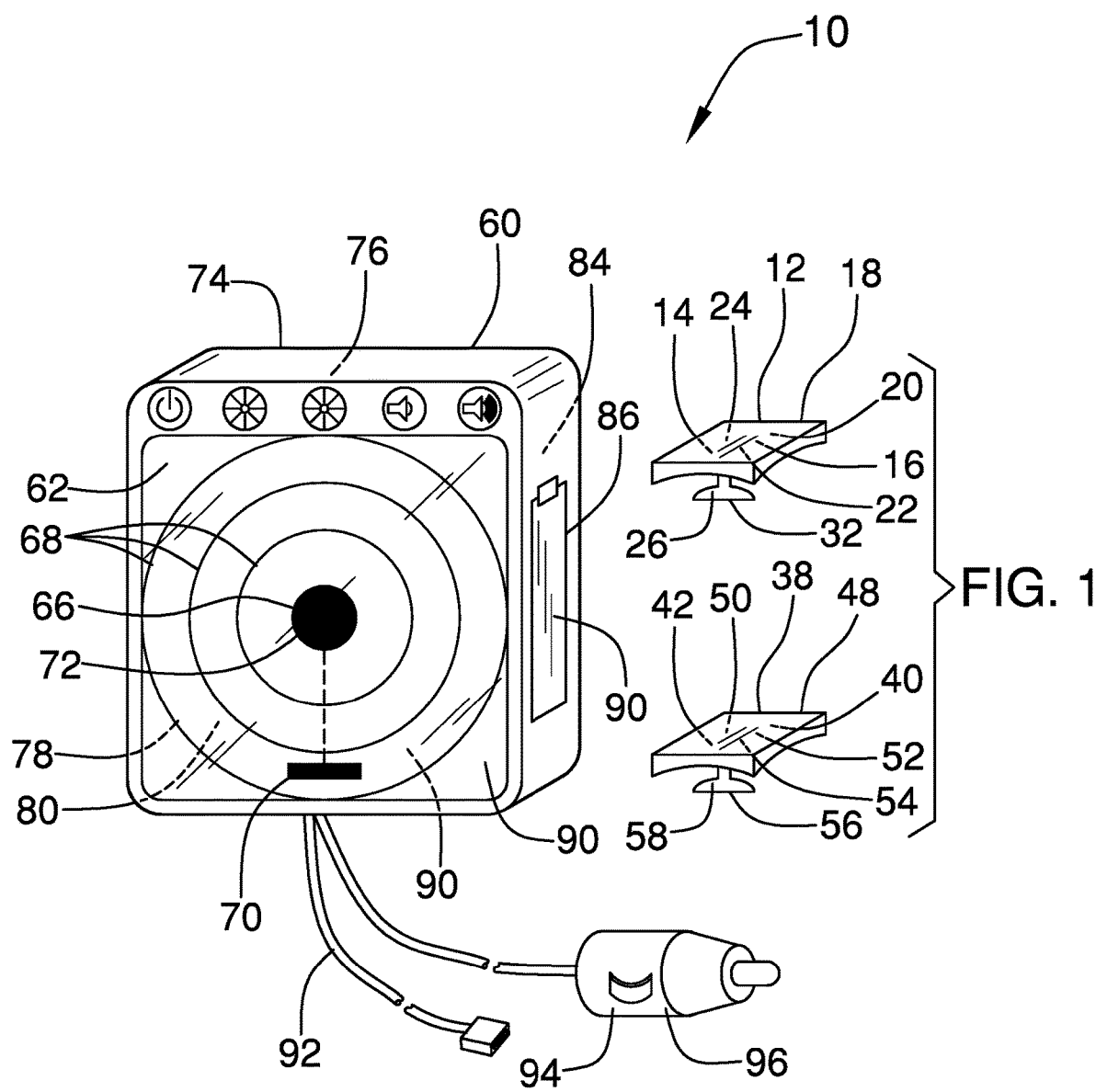
FIG. 1 is an isometric perspective view of a hitch and ball alignment device according to an embodiment of the disclosure.
Figure 2:
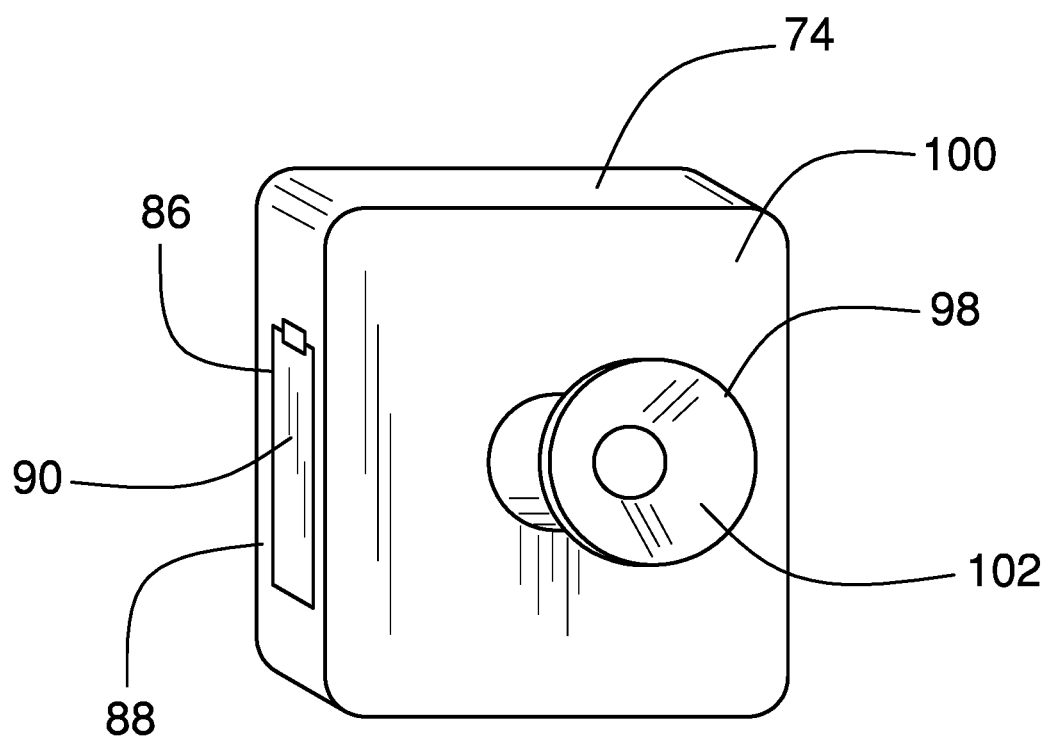
FIG. 2 is an isometric perspective view of an embodiment of the disclosure.
Figure 3:
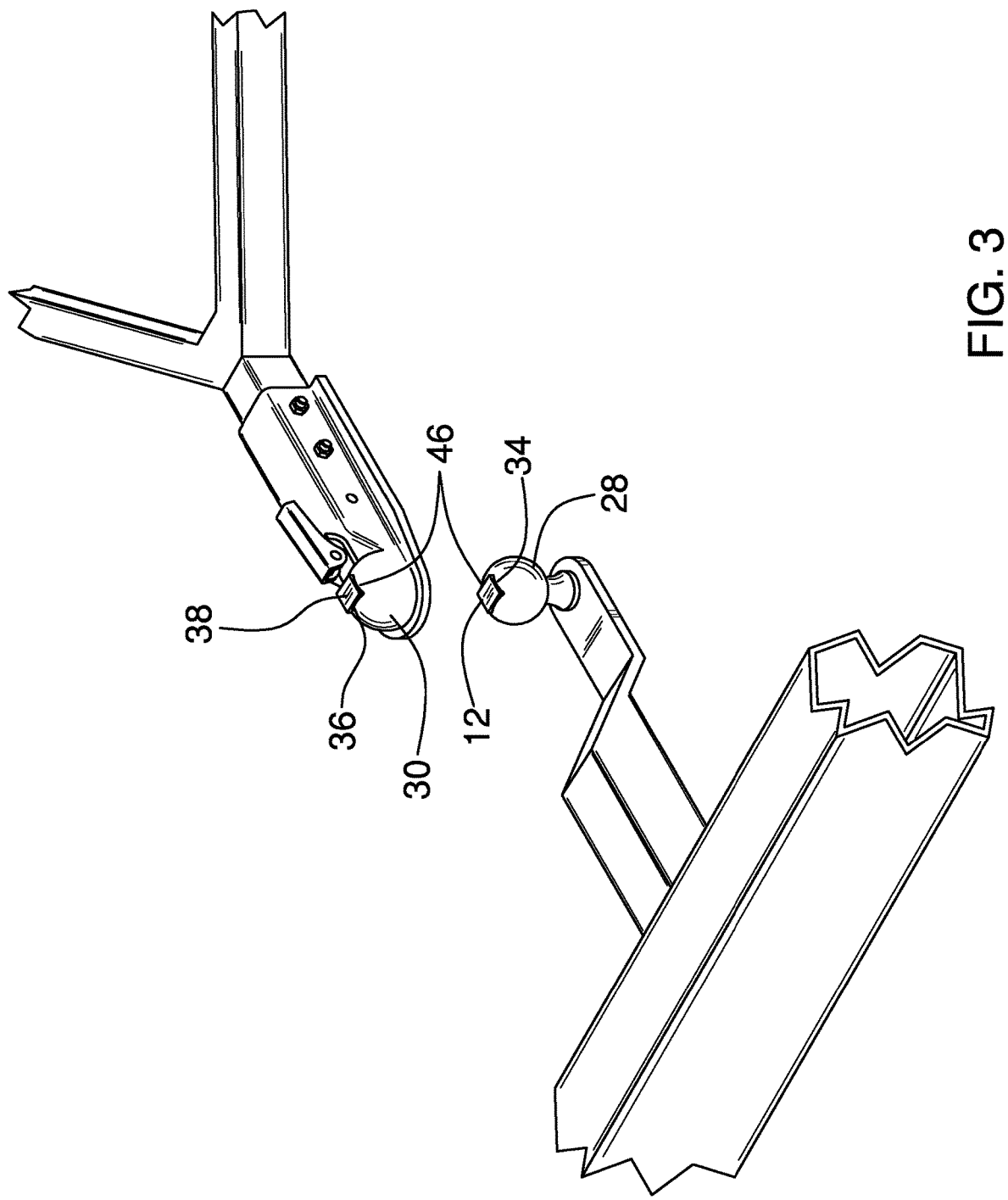
FIG. 3 is an in-use view of an embodiment of the disclosure.
Figure 4:
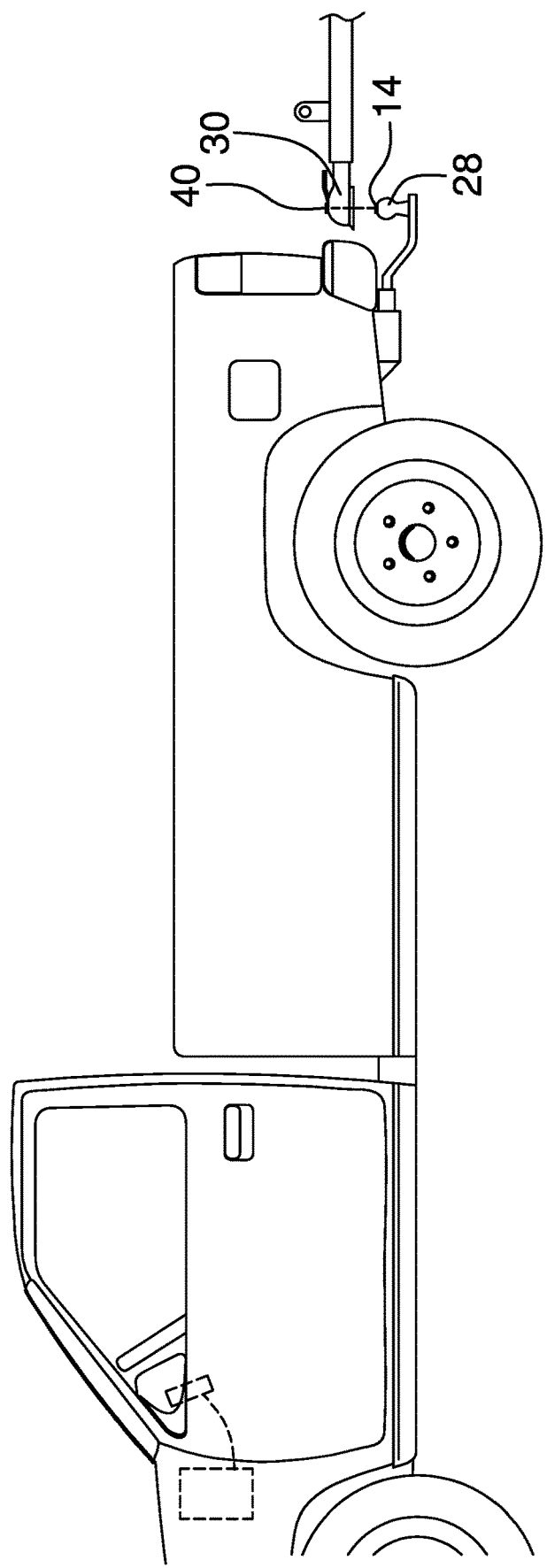
FIG. 4 is an in-use view of an embodiment of the disclosure.

With reference now to the drawings, and in particular to FIGS. 1 through 4 thereof, a new alignment device embodying the principles and concepts of an embodiment of the disclosure and generally designated by the reference numeral 10 will be described.

As best illustrated in FIGS. 1 through 4, the hitch and ball alignment device 10 generally comprises a first sensing unit 12 and a controller 60. The first sensing unit 12 comprises a first sensor 14, which is position type, capacitive proximity type, Eddy-current type, inductive proximity type, optical type, or the like. The first sensing unit 12 also comprises a first transmitter 16.

The first sensing unit 12 comprises a first housing 18 that defines a first interior space 20. The first sensor 14, the first transmitter 16, a first battery 22, and a first microprocessor 24 are coupled to the first housing 18 and are positioned in the first interior space 20. The first microprocessor 24 is operationally coupled to the first sensor 14, the first transmitter 16, and the first battery 22.

A first coupler 26 is coupled to the first sensing unit 12. The first coupler 26 is configured to removably couple the first sensing unit 12 to one of a tow ball 28 that is coupled to a vehicle and a trailer tongue 30. The first coupler 26 comprises a first cup 32 that is resiliently compressible. The first cup 32 is configured to be selectively compressed on an upper face 34 of the tow ball 28 and a top 36 of the trailer tongue 30 to selectively and removably couple the first sensing unit 12 to the tow ball 28 and the trailer tongue 30.

The device 10 also comprises a second sensing unit 38. The second sensing unit 38 comprises a second sensor 40, which is position type, and a second transmitter 42. The second sensing unit 38 also may be magnetic so that the first sensing unit 12 and the second sensing unit 38 together comprise a Hall effect sensor 46.

The second sensing unit 38 comprises a second housing 48 that defines a second interior space 50. The second sensor 40, the second transmitter 42, a second battery 52, and a second microprocessor 54 are coupled to the second housing 48 and are positioned in the second interior space 50. The second microprocessor 54 is operationally coupled to the second sensor 40, the second transmitter 42, and the second battery 52.

A second coupler 56 is coupled to the second sensing unit 38 and is configured to selectively and removably couple the second sensing unit 38 to the other of the tow ball 28 and the trailer tongue 30. The second coupler 56 comprises a second cup 58 that is resiliently compressible. The second cup 58 is configured to selectively and removably couple the second sensing unit 38 to the other of the tow ball 28 and the trailer tongue 30.

The controller 60 comprises a screen 62 and a receiver 64. The first sensor 14 is configured to determine a distance between the first sensing unit 12 and the other of the tow ball 28 and the trailer tongue 30 and to signal the controller 60 via the first transmitter 16. The controller 60 is positioned to display positions of the tow ball 28 and the trailer tongue 30 on the screen 62 to guide a user to align the tow ball 28 with the trailer tongue 30.

The screen 62 is configured to centrally display a red dot 66 representing the one of a tow ball 28 and the trailer tongue 30 surrounded by a plurality of concentric circles 68. A bar 70 representing the other of the tow ball 28 and the trailer tongue 30 moves toward the red dot 66 as the user guides the tow ball 28 to the trailer tongue 30. When the bar 70 aligns with the red dot 66, the tow ball 28 is aligned with the trailer tongue 30 and the red dot 66 changes to a green dot 72.

The controller 60 also is positioned to receive a position signal from the second sensor 40 via the second transmitter 42 and to display the positions of the tow ball 28 and the trailer tongue 30 on the screen 62 to guide the user to align the tow ball 28 with the trailer tongue 30. The second sensing unit 38 can serve as backup to the first sensing unit 12 in event of failure.

The controller 60 comprises a third housing 74 that defines an internal space 76. The third housing 74 is substantially rectangularly box shaped. The receiver 64, a power module 78, and a third microprocessor 80 are coupled to the third housing 74 and are positioned in the internal space 76. The third microprocessor 80 is operationally coupled to the screen 62, the receiver 64, and the power module 78. The screen 62 is coupled to a front 82 of the third housing 74. The power module 78 comprises a third battery 84, which is rechargeable. An orifice 86 is positioned in a side 88 of the third housing 74 proximate to the third battery 84 and is configured to allow access to the internal space 76 to service the third battery 84. A panel 90 is selectively couplable to the third housing 74 to close the orifice 86.

A cord 92 is coupled to and extends from the third housing 74. The cord 92 is operationally coupled to the third battery 84. A connector 94, which comprises a cigarette lighter plug 96, is coupled to the cord 92 distal from the third housing 74. The connector 94 is configured to couple to an electrical circuit of the vehicle to charge the third battery 84.

A third coupler 98 is coupled to a back 100 of the third housing 74. The third coupler 98 is configured to removably couple the controller 60 to an interior surface of the vehicle proximate to the user. The third coupler 98 comprises a third cup 102 that is resiliently compressible. The third cup 102 is configured to be selectively compressed against the interior surface to selectively and removably couple the controller 60 to the interior surface of the vehicle proximate to the user.

In use, the third cup 102 is compressed against the interior surface to couple the controller 60 to the vehicle proximate to the user. The first cup 32 is compressed on either the upper face 34 of the tow ball 28 or the top 36 of the trailer tongue 30 to couple the first sensing unit 12 to either the tow ball 28 or the trailer tongue 30. The screen 62 is configured to display the red dot 66 surrounded by the plurality of concentric circles 68. The bar 70 moves toward the red dot 66 as the user guides the tow ball 28 to the trailer tongue 30. When the bar 70 aligns with the red dot 66, the tow ball 28 is aligned with the trailer tongue 30, and the red dot 66 changes to the green dot 72.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A hitch and ball alignment device comprising:
   a first sensing unit comprising a first sensor and a first transmitter, the first sensor being position type, the first sensing unit comprising
      a first housing defining a first interior space, the first sensor and the first transmitter being coupled to the first housing and positioned in the first interior space,
      a first battery coupled to the first housing and positioned in the first interior space, and
      a first microprocessor coupled to the first housing and positioned in the first interior space, the first microprocessor being operationally coupled to the first sensor, the first transmitter, and the first battery;
   a first coupler coupled to the first sensing unit wherein the first coupler is configured for removably coupling the first sensing unit to one of a tow ball coupled to a vehicle and a trailer tongue; and
   a controller comprising a screen and a receiver wherein the first sensor is configured for determining a distance between the first sensing unit and the other of the tow ball coupled to a vehicle and the trailer tongue and for signaling the controller via the first transmitter positioning the controller for displaying positions of the tow ball and the trailer tongue on the screen for guiding a user for aligning the tow ball with the trailer tongue.

2. The device of claim 1, further including the first sensing unit being capacitive proximity type.

3. The device of claim 1, further including the first sensing unit being Eddy-current type.

4. The device of claim 1, further including the first sensing unit being inductive proximity type.

5. The device of claim 1, further including the first sensing unit being optical type.

6. The device of claim 1, further including the first coupler comprising a first cup, the first cup being resiliently compressible wherein the first cup is configured for selectively compressing on an upper face of the tow ball and a top of the trailer tongue for selectively removably coupling the first sensing unit to the tow ball and the trailer tongue.

7. A hitch and ball alignment device comprising:
   a first sensing unit comprising a first sensor and a first transmitter, the first sensor being position type;
   a first coupler coupled to the first sensing unit wherein the first coupler is configured for removably coupling the first sensing unit to one of a tow ball coupled to a vehicle and a trailer tongue;
   a controller comprising a screen and a receiver wherein the first sensor is configured for determining a distance between the first sensing unit and the other of the tow ball coupled to a vehicle and the trailer tongue and for signaling the controller via the first transmitter positioning the controller for displaying positions of the tow ball and the trailer tongue on the screen for guiding a user for aligning the tow ball with the trailer tongue;
   a second sensing unit comprising a second sensor and a second transmitter, the second sensor being position type; and
   a second coupler coupled to the second sensing unit wherein the second coupler is configured for selectively removably coupling the second sensing unit to the other of the tow ball and the trailer tongue wherein the controller is positioned for receiving a position signal from the second sensor via the second transmitter and for displaying positions of the tow ball and the trailer tongue on the screen for guiding the user for aligning the tow ball with the trailer tongue.

8. The device of claim 7, further including the second sensing unit comprising:
   a second housing defining a second interior space, the second sensor and the second transmitter being coupled to the second housing and positioned in the second interior space;
   a second battery coupled to the second housing and positioned in the second interior space; and
   a second microprocessor coupled to the second housing and positioned in the second interior space, the second microprocessor being operationally coupled to the second sensor, the second transmitter, and the second battery.

9. The device of claim 7, further including the second sensing unit being magnetic such that the first sensing unit and the second sensing unit comprise a Hall effect sensor.

10. The device of claim 7, further including the second coupler comprising a second cup, the second cup being resiliently compressible wherein the second cup is configured for selectively removably coupling the second sensing unit to the other of the tow ball and the trailer tongue.

11. A hitch and ball alignment device comprising:
    a first sensing unit comprising a first sensor and a first transmitter, the first sensor being position type;
    a first coupler coupled to the first sensing unit wherein the first coupler is configured for removably coupling the first sensing unit to one of a tow ball coupled to a vehicle and a trailer tongue;
    a controller comprising a screen and a receiver wherein the first sensor is configured for determining a distance between the first sensing unit and the other of the tow ball coupled to a vehicle and the trailer tongue and for signaling the controller via the first transmitter positioning the controller for displaying positions of the tow ball and the trailer tongue on the screen for guiding a user for aligning the tow ball with the trailer tongue;
    further including the controller comprising
       a third housing defining an internal space, the receiver being coupled to the third housing and positioned in the internal space, the screen being coupled to a front of the third housing;
       a power module coupled to the third housing and positioned in the internal space; and
       a third microprocessor coupled to the third housing and positioned in the internal space, the third microprocessor being operationally coupled to the screen, the receiver, and the power module.

12. The device of claim 11, further including the third housing being substantially rectangularly box shaped.

13. The device of claim 11, further including the power module comprising a third battery.

14. The device of claim 13, further comprising:
    the third battery being rechargeable;
    an orifice positioned in a side of the third housing proximate to the third battery wherein the orifice is configured for accessing the internal space for servicing the third battery;
    a panel selectively couplable to the third housing for closing the orifice;
    a cord coupled to and extending from the third housing, the cord being operationally coupled to the third battery; and
    a connector coupled to the cord distal from the third housing, the connector being configured for coupling to an electrical circuit of the vehicle for charging the third battery.

15. The device of claim 14, further including the connector comprising a cigarette lighter plug.

16. The device of claim 11, further including a third coupler coupled to a back of the third housing wherein the third coupler is configured for removably coupling the controller to an interior surface of the vehicle proximate to the user.

17. The device of claim 16, further including the third coupler comprising a third cup, the third cup being resiliently compressible wherein the third cup is configured for selectively compressing against the interior surface for selectively removably coupling the controller to the interior surface of the vehicle proximate to the user.

18. The device of claim 1 further comprising:
    the first sensing unit being capacitive proximity type or the first sensing unit being Eddy-current type or the first sensing unit being inductive proximity type or the first sensing unit being optical type;
    the first coupler comprising a first cup, the first cup being resiliently compressible wherein the first cup is configured for selectively compressing on an upper face of the tow ball and a top of the trailer tongue for selectively removably coupling the first sensing unit to the tow ball and the trailer tongue;
    a second sensing unit comprising a second sensor and a second transmitter, the second sensor being position type, the second sensing unit being magnetic such that the first sensing unit and the second sensing unit comprise a Hall effect sensor, the second sensing unit comprising:
       a second housing defining a second interior space, the second sensor and the second transmitter being coupled to the second housing and positioned in the second interior space,
       a second battery coupled to the second housing and positioned in the second interior space, and a second microprocessor coupled to the second housing and positioned in the second interior space, the second microprocessor being operationally coupled to the second sensor, the second transmitter, and the second battery;

a second coupler coupled to the second sensing unit wherein the second coupler is configured for selectively removably coupling the second sensing unit to the other of the tow ball and the trailer tongue, the second coupler comprising a second cup, the second cup being resiliently compressible wherein the second cup is configured for selectively removably coupling the second sensing unit to the other of the tow ball and the trailer tongue;

wherein the controller is positioned for receiving a position signal from the second sensor via the second transmitter and for displaying positions of the tow ball and the trailer tongue on the screen for guiding the user for aligning the tow ball with the trailer tongue, the controller comprising:

a third housing defining an internal space, the third housing being substantially rectangularly box shaped, the receiver being coupled to the third housing and positioned in the internal space, the screen being coupled to a front of the third housing, a power module coupled to the third housing and positioned in the internal space, the power module comprising a third battery, the third battery being rechargeable, a cord coupled to and extending from the third housing, the cord being operationally coupled to the third battery, an orifice positioned in a side of the third housing proximate to the third battery wherein the orifice is configured for accessing the internal space for servicing the third battery, a panel selectively couplable to the third housing for closing the orifice, a connector coupled to the cord distal from the third housing, the connector being configured for coupling to an electrical circuit of the vehicle for charging the third battery, the connector comprising a cigarette lighter plug, and a third microprocessor coupled to the third housing and positioned in the internal space, the third microprocessor being operationally coupled to the screen, the receiver, and the power module; and a third coupler coupled to a back of the third housing wherein the third coupler is configured for removably coupling the controller to an interior surface of the vehicle proximate to the user, the third coupler comprising a third cup, the third cup being resiliently compressible wherein the third cup is configured for selectively compressing against the interior surface for selectively removably coupling the controller to the interior surface of the vehicle proximate to the user.

\* \* \* \* \*